Sept. 8, 1959 R. R. BALAGUER 2,903,499
PRIMARY BATTERY
Filed March 16, 1956 2 Sheets-Sheet 1
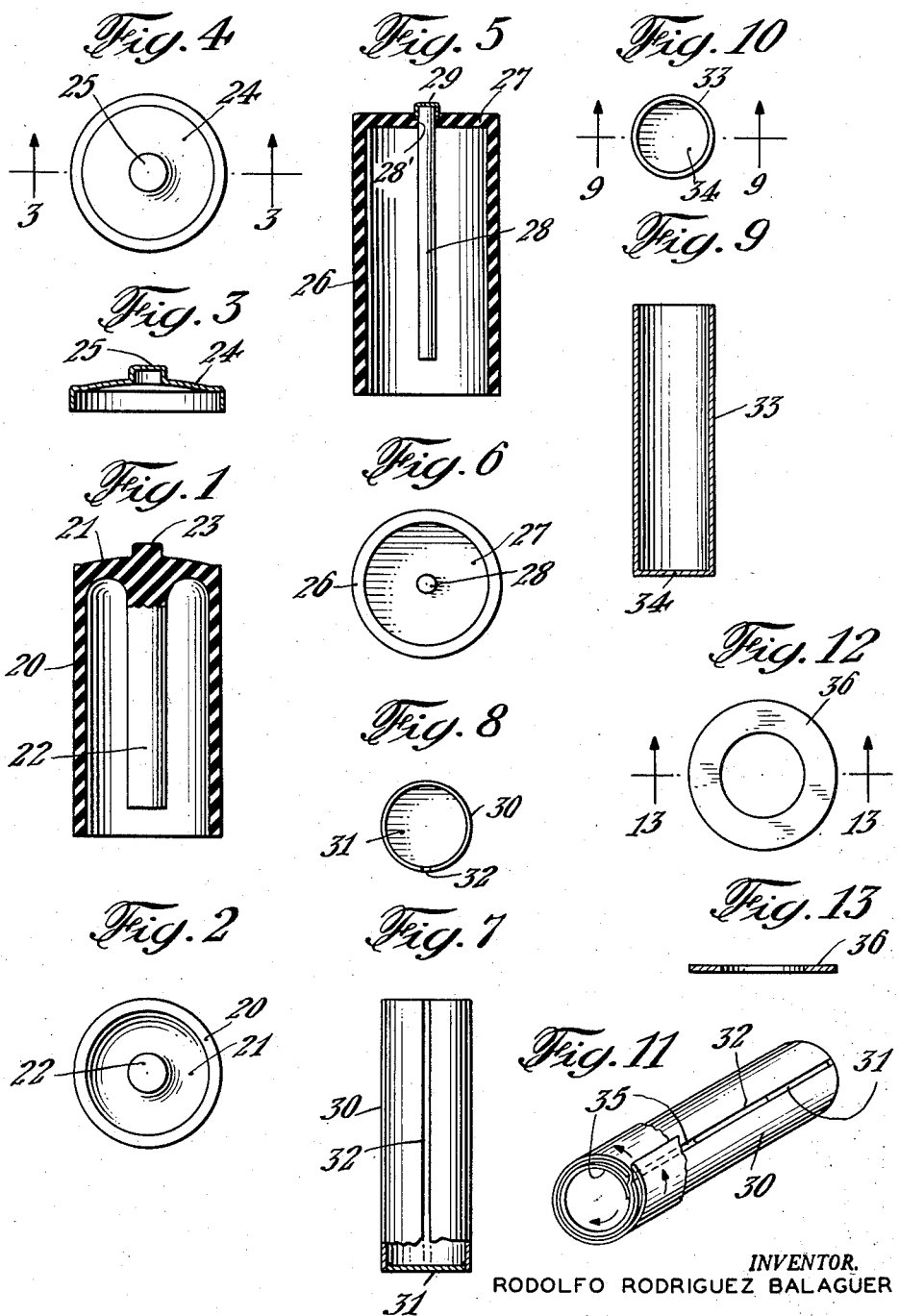
INVENTOR.
RODOLFO RODRIGUEZ BALAGUER
BY
Charles B. Smith
ATTORNEY

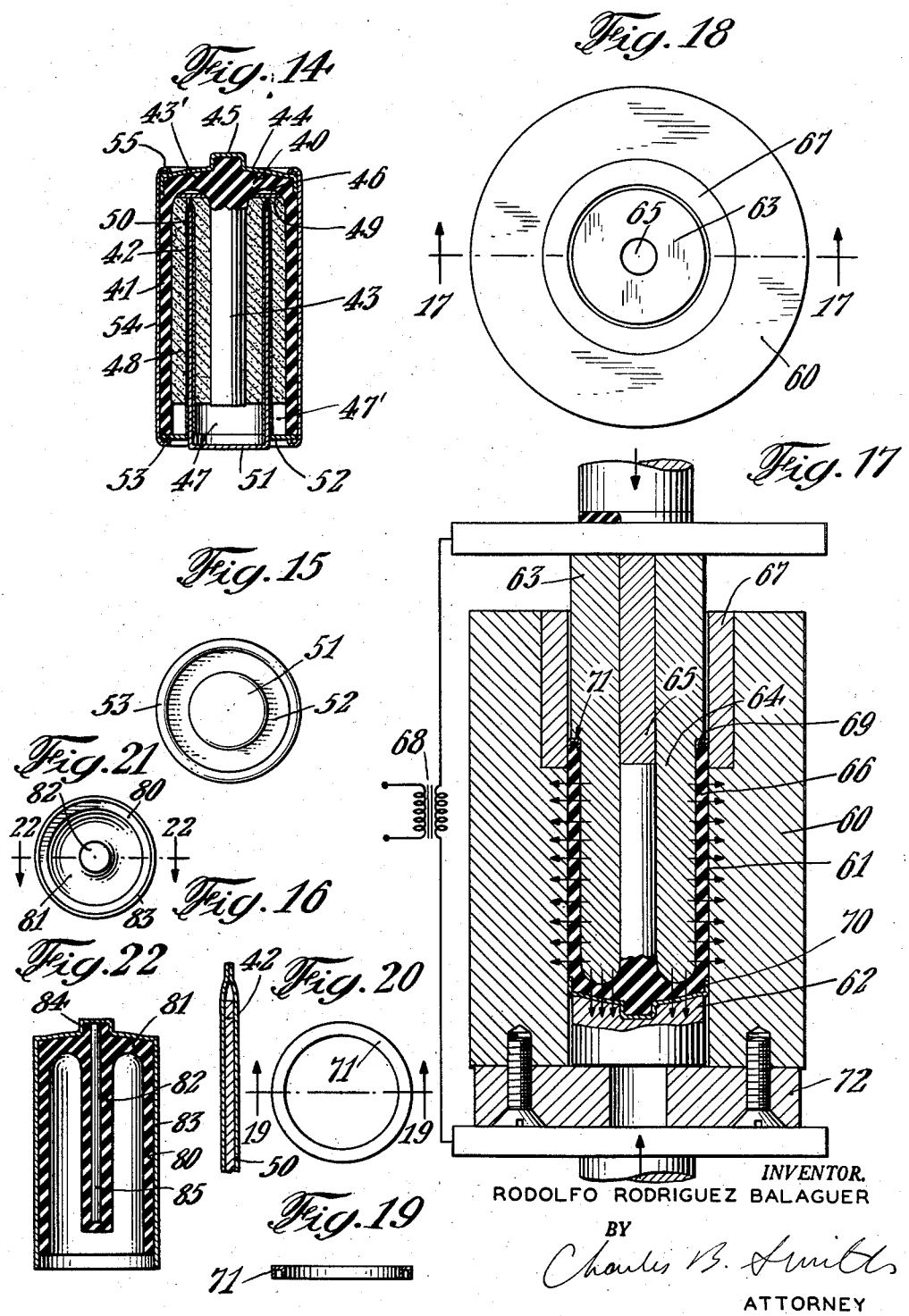

United States Patent Office 2,903,499
Patented Sept. 8, 1959

2,903,499

PRIMARY BATTERY

Rodolfo Rodriguez Balaguer, Union de Reyes, Cuba, assignor of sixty-two and one-half percent to James D. Hedges, Havana, Cuba, and twelve and one-half percent to Bessemer Securities Corporation, New York, N.Y., a corporation of Delaware Application March 16, 1956, Serial No. 572,085

17 Claims. (Cl. 136—107)

This invention relates to the primary galvanic cells in general, and particularly to those of the so-called "dry" type.

The usual type of dry cell battery, which has been used for many years, customarily comprises a nonconsumable carbon cathode and a consumable metallic anode, usually zinc, which also serves as the container for the cell. A depolarizer mix containing, for example, manganese dioxide with acetylene carbon black, and an electrolyte, such as a zinc chloride and ammonium chloride solution, are inserted in the cell between the anode and the cathode, with a bibulous material such as starch paste or paper placed between the anode and the depolarizer mix to prevent electrical contact between the anode and the mix while permitting passage of ions.

Although the usual design of dry cell batteries has many desirable features, this type of cell has the long recognized disadvantage that the consumable metallic anode used as a container for the cell frequently becomes perforated and permits the liquid from the cell to exude and cause damage to the apparatus in which the cell is being used.

Many means have been suggested to overcome the damaging effects of a perforated anodic container, such as enclosing the cell in an additional jacket of metal or moisture-proof cardboard.

Other attempts to solve the problem of leakage have resulted in the development of so-called "inside-out" battery designs wherein a nonconsumable cathode element is used for the container and a metallic anode is placed within the cell. Such inside-out designs are exemplified in Teas Patent No. 2,605,299, issued July 19, 1952, and Balaguer Patent No. 2,628,261, issued February 10, 1953.

The difficulty and expense of obtaining suitable nonconsumable leakproof and wet proof cathodic containers for such cells has been one restriction to their use. Baked carbon cups, suitably treated to reduce their permeability to water and water vapor could be used but are too costly for widespread application. One special process for making containers for such cells is exemplified in Shirland Patent No. 2,605,300, issued July 29, 1952. The cathodic elements made by this patented process have the disadvantage, however, that they lack sufficient strength to permit their use as unsupported containers. Further, the process is limited to certain special materials.

Another defect of the "inside-out" battery designs heretofore conceived is that these do not have the uniform spacing between anode and cathode requisite for uniform current density over the entire active electrode surfaces.

A principal object of the present invention has been the provision of a novel and improved leakproof dry cell battery capable of easy and low cost manufacture and which combines the advantages of conventional and inside-out dry cell batteries.

A particular object of the invention has been the provision of a dry cell battery in which the distance between the anode and the cathode collector element is minimized.

Another object of the invention has been the provision of a dry cell battery in which the effective anode area is maximized.

Another object of the invention has been the provision of a dry cell battery in which no reduction in anode area occurs during cell discharge.

Still another object of the invention has been the provision of a dry cell battery in which anode corrosion is made substantially uniform over the entire anode area.

Still another object of the invention has been the provision of a dry cell battery in which substantially uniform utilization of the depolarizer material takes place and in which the utilization of the depolarizer is maximized.

An important object of the invention has been to provide a dry cell battery in which all or at least the major portion of the container is resistant to electrolyte action so that the battery will be leakproof.

Another object of the invention has been to provide a highly conductive self-supporting carbonaceous container which, without separate water proofing treatment, is sufficiently impermeable to resist electrolyte penetration and prevent loss of moisture by evaporation.

A feature of the invention has been the provision of a dry cell battery construction in which electrolyte concentration will remain substantially uniform over the entire surface of the anode, thus avoiding concentration cells which cause accelerated corrosion of the anode metal.

Another feature of the invention has been the provision of a dry cell battery in which the anode is not needed for structural strength and can, therefore, substantially completely be consumed.

Yet another feature of the invention has been the provision of a dry cell battery in which the optimum degree of amalgamation of the anode may be provided, to minimize corrosion and raise the battery output.

Another feature of the invention has been the provision of a dry cell battery anode structure without any sharp bends. Such a structure reduces the possibility of stress corrosion.

An important object of the invention has been the provision of a dry cell battery which will exhibit better shelf life, light duty and heavy duty characteristics than comparable standard or inside-out batteries now available on the market.

A feature of the invention has been the provision of a structure which results in unusually low internal resistance, making the cell admirably suited to heavy drain applications such as photo-flash.

In accordance with yet another aspect of the invention, a further important object of the invention has been the provision of a novel and improved cup-shaped green carbon cathode exhibiting substantial structural strength, low permeability, and unusually low resistivity characteristics.

Other and further objects, features and advantages of the invention will appear more fully from the following description.

A dry cell battery in accordance with the invention comprises a first cathode, a second cathode disposed substantially concentrically about the first cathode and electrically connected thereto, an anode disposed between the cathodes and substantially concentric therewith and battery mix disposed between the anode and the cathodes. In a preferred form of the battery according to the invention, the first cathode is realized as a carbon rod disposed generally along the longitudinal axis of the second cathode which is in the shape of a carbon cup. The carbon rod may be integral with or suitably affixed to the base of the carbon cup. In this form of the invention the anode is annular in shape and is substantially concentric with the cup and rod. A suitable bibulous material is coated on the anode to prevent direct contact between the anode and the mix.

The invention will now be described in greater detail with reference to the appended drawings in which:

Fig. 1 is a central sectional view through one form of carbon cathode in accordance with the invention;

Fig. 2 is a bottom plan view of the cup of Fig. 1;

Fig. 3 is a sectional view of a top contact member adapted to fit over the top of the cup of Fig. 1 and being taken along the line 3—3 of Fig. 4;

Fig. 4 is a top plan view of the contact member of Fig. 3;

Fig. 5 is a central sectional view through another type of carbon cathode constructed in accordance with the invention;

Fig. 6 is a bottom plan view of the cathode of Fig. 5;

Fig. 7 is a side elevational view, partly in cross section, of one form of anode construction in accordance with the invention;

Fig. 8 is a top plan view of the anode of Fig. 7;

Fig. 9 is a central longitudinal sectional view through another type of anode according to the invention;

Fig. 10 is a top plan view of the anode of Fig. 9;

Fig. 11 is an isometric view of the anode of Fig. 7 with a coating of bibulous material thereon;

Fig. 12 is a top plan view of a closer washer;

Fig. 13 is a sectional view taken along the line 13—13 of Fig. 12;

Fig. 14 is a sectional view of an assembled battery according to the invention, taken along the line 14—14 of Fig. 15;

Fig. 15 is a bottom plan view of the assembled battery of Fig. 14;

Fig. 16 is an enlarged detailed view of a portion of the anode of Fig. 14, illustrating the bibulous coating;

Fig. 17 is a sectional view taken along the line 17—17 of Fig. 18 and illustrates an oven, according to the invention, which is suitable for carrying out the process of the invention;

Fig. 18 is a top plan view of the oven of Fig. 17;

Fig. 19 is a sectional view taken along the line 19—19 of Fig. 20, and illustrates a protecting ring which may be molded to the bottom of the battery cup of the invention;

Fig. 20 is a plan view of the ring of Fig. 19;

Fig. 21 is a bottom plan view of a modified form of carbon cathode structure in accordance with the invention; and Fig. 22 is a sectional view of the cathode structure of Fig. 21 taken along the line 22—22 of Fig. 21.

Referring now to the drawings, and more particularly to Figs. 1 and 2, the carbon cathode of the invention may be formed as an integral structure having a cylindrical outer wall 20, a closed end 21, and a central rod portion 22 extending along the longitudinal axis of the cup 20 from the closed end 21. The end 21 may be provided with an upwardly extending centrally located boss 23 serving as a contact. A thin wall metal shell 24 (Fig. 3), having a shape conforming closely to the shape of the closed end 21 is adapted to be press fit over the closed end 21. The shell 24 is provided with a boss 25 corresponding to the boss 23 and which serves as the positive terminal of the battery.

In the modified cathode construction, illustrated in Figs. 5 and 6, there is provided a cylindrical outer wall 26 and a closed end 27 integral with the wall 26. The end wall 27 is provided with a centrally located circular hole into which may be fitted a cylindrical rod 28. The rod 28, which extends along the longitudinal axis of the cylinder 26 and which is concentric therewith, extends beyond the end wall 27. A metal cap 29 may be provided on the outer end of the rod 28 to serve as the battery positive terminal. In order to accommodate the sides of cap 29 and also firmly to hold the rod 28, the end wall 27 may be provided with a shoulder 28', against which the open end of the cap 29 is pressed. The open end of the cylindrical wall 26 extends beyond the end of the rod 28 in order to facilitate the battery assembly. If desired, the configuration of the cathode structure of Figs. 5 and 6 may be identical to that of Figs. 1 and 2, and the cap 21 could then be made identical with the shell 24.

The anode of Figs. 7 and 8 is an annular elongated cylinder 30, open at one end and closed at the other by a bottom wall 31, which may be integral with the wall 30 or which may be affixed thereto as by soldering. The bottom wall 31 serves as the battery negative contact and need not be made of the same metal since it does not take part in the chemical reactions involved in the generation of electrical current. If desired, the bottom wall 31 may be eliminated provided suitable provision is made for electrical contact between the cylinder 30 and the battery negative terminal and provided the center of the anode is sealed in some other manner. In this form of anode construction there is provided an elongated slot 32 which extends from the open end of the anode at least to a point along its length representing the maximum immersion of the anode into the battery mix and preferably extends nearly to the bottom wall 31.

The anode of Figs. 9 and 10 is similar to that of Figs. 7 and 8, but is preferably formed as an integral piece with cylindrical side walls 33 and a bottom wall 34. This form of anode does not have the elongated slot 32, but it may be provided with a short slot or hole not shown in the side wall 33 and near the bottom wall 34 to provide for venting air from the inside of the anode during cell assembly and for inter-connection between the spaces 47 and 47'. Fig. 14. This slot or hole should be so located that it is inside the assembled cell, or any portion of it that opens to the outside of the cell should be sealed off after cell assembly. It will be understood that it would also be possible to provide a vent hole in the bottom wall 34 to be used during cell assembly and then sealed off.

As is customary in dry cell battery construction, the anode, or at least that portion thereof which will extend into the battery mix, is provided with a separator of bibulous material, such as paper or gel, to prevent direct contact of the mix with the metallic anode. The bibulous material may be applied to the anode by wrapping, spraying, dipping or other suitable means, herein referred to as "coating" or "coated." As shown in Fig. 11, an adhesive bibulous paper may be applied to the slotted anode of Fig. 7 by wrapping. A single piece of paper may be used to coat all surfaces of the anode (both inside and outside) which may come into contact with the battery mix.

A washer 36 (Figs. 12 and 13) which may be made of fibrous or other suitable electrically insulating material may be provided to act as a spacer between the outer cathode and the anode, and also to serve as a part of the battery bottom wall.

Figs. 14 and 15 illustrate an assembled dry cell battery with a carbon cathode structure 40 constructed as shown in Fig. 1 and with a consumable metallic anode 42 constructed as shown in Fig. 9. The cathode structure 40 comprises a cylindrical first cathode element 41, a closed end 43' and a central rod 43 forming a second cathode element. A metal cap 44 having a contact-forming boss 45 is provided over the closed end 43'. The cylindrical anode 42 is concentric with the cylinder 41 and the rod 43 and is located within the annular space between these cathode elements. The remainder of the annular space, with the exception of air spaces 47 and 47', adjacent the open end of the cathode structure 40 and the closed end of the anode, is filled with the battery mix 48. By the term "battery mix" is meant the depolarizing agent, electrolyte and any other chemicals which may be included in a primary battery. The spaces 47 and 47' are provided as a place for the reception of liquid exuded upon discharge of the cell. A space 46 may serve the same purpose. The battery mix is preferably packed in relatively tightly and it will not generally be necessary to provide a washer to keep the mix from entering the spaces 47 and 47'. As best shown in Fig. 16, the metallic anode 42 may be provided with a suitable bibulous coating 50 which prevents direct contact between the anode and the battery mix. The bibulous coating need only cover those portions of the anode which extend into the battery mix but will normally cover an additional bordering area to insure against contact between the anode and the mix. The remainder of the anode structure serves only for electrical contact and closure purposes. Thus, in Fig. 14, the closed end 51 of the anode 42 serves as the battery negative terminal and also as a portion of the bottom closure of the battery. A fiber or other suitable insulating washer 52 of the type shown in Figs. 12 and 13 serves to space properly the bottom of the anode 42 from the bottom of the cylinder 41 and also to close the remainder of the bottom end of the battery. Where the washer 52 is joined to the anode and to the cathode, there should preferably be tight and leakproof joints. The washer may be cemented in place or may be a tight press fit over the anode and held against the cathode by a suitable outer jacket. In the Fig. 14, is shown a cylinder 54 which surrounds the cylinder 41 and which has an inturned lip bearing against the washer 52 and holding it in place. Alternatively any suitable means of sealing the washer to the anode and the cathode may be used. The cylinder 54, which may be made of paper, plastic or other suitable material (for example cellulose acetate plastic) serves primarily as an outer covering and may be omitted if desired. For certain purposes however, an outer covering that is itself an electrical insulator or that is insulated from the cathode, may be desirable. Preferably an inturned lip 55 is provided at the other end of the cylinder 54. The washer 52 should be impervious to the liquid which will be exuded into the air space 47 on battery discharge. The washer 49, on the other hand, may be porous. The washer 49 may be omitted and the anode prevented from contacting the cathode merely by proper spacing. It will also be understood that the entire circumference of the anode need not project through the bottom sealing member 52, but that a single disc may be used to seal the entire bottom of the cell, with a suitable contact area on such disc in electrical connection with the anode and suitably insulated from the cathode.

The external diameter of the cathode element 41 will normally be selected to correspond with the size customarily used in the class of service for which the battery is designed. The wall of the cathode element 41 is preferably made as thin as is consistent with manufacturing techniques and with adequate structural strength requirements. If the wall is made thicker than necessary, the space for battery mix will be correspondingly reduced, which is generally undesirable. Similarly, the rod portion 43 forming another cathode element is preferably made as thin as possible consistent with manufacturing techniques. In general, the portion 43 will be thicker when formed integrally with the remainder of the cathode structure than when it is a separately inserted element of the type shown in Fig. 5. In one form of battery construction which has proven desirable, the spacing between the outer wall of the cathode element 43 and the inner wall of the anode 42 is made equal to the spacing between the outer wall of the anode 42 and the inner wall of the cathode element 41. In this way the anode-cathode spacing is constant throughout the battery, which may have advantages in some situations. However, the volume of battery mix included between the cathode element 43 and the anode will then be smaller than the volume of battery mix included between the cathode element 41 and the anode.

In another form of battery construction, the diameter of the anode element 42 is selected so that equal volumes of battery mix will be included between the anode and each of the cathode elements. It is believed that this form of construction will promote uniform and more complete utilization of the depolarizer.

In still another form of battery construction, particularly with a cathode structure of the type shown in Figure 5, the electrical resistance of the central cathode element or rod may be made equal to the electrical resistance of the outer cathode element or cup (by suitable design of the central cathode element), thus providing for equal voltage drops along the cathode elements. Such a form of construction will generally involve the use of a carbon rod made from a graphitic material, since the greater conductivity of graphite will balance the low resistance resulting from the larger diameter of the outer cathode element. A highly conductive central cathode element has the advantage of requiring a smaller diameter, hence leaving a larger space for battery mix. By choosing a suitable diameter for the anode element, the anode-cathode spacings may be made identical or the anode-cathode battery mix volumes may be made identical. Any other desired spacing relationship may be employed.

It should be understood that the diameter of the anode may be selected in accordance with the particular needs of the service requirements which the battery is to meet. In general the anode thickness will be selected with a view to substantially complete utilization of the zinc or other metal, since the anode is not required to exhibit structural strength. Also, since the anode strength is of minor significance anode metal of high purity may be used and an optimum amount of amalgamation may be provided in order to minimize corrosion.

In one embodiment of the invention, a battery may be constructed with symmetrical arrangement of anode and cathode. In such a battery, the pH and chemical concentrations will remain substantially constant from one portion of the anode surface to another. It will be understood that such uniformity will prevent concentration cells which tend to corrode the anode and waste the energy producing potential of the cell. A cylindrical anode of the type illustrated besides providing a symmetrical arrangement is also particularly desirable because it lacks sharp bends, thus minimizing the possibility of stress corrosion. However, anodes of other forms, such as with corrugations to increase the surface area, can be used.

Corrosion and structural problems inherent in conventional battery constructions have raised difficult problems in the design of satisfactory primary cells using magnesium, aluminum or other readily corroded anode metals, particularly when these are used as cell containers. The battery of the present invention is admirably suited to a construction in which such metals are used for the anode elements.

In forming the cathode cup of the invention (either with or without an integral central cathode element) a wide variety of raw materials can be employed and any suitable method of manufacture may be used. However, in accordance with a further aspect of the invention, a particularly desirable method of manufacture involves forming a mix containing primarily comminuted particles of an electrically conductive carbonaceous substance and, in lesser part, particles of a binder material which becomes plastic at a relatively low temperature. The mix is placed in a mold and then contacted with a piston having a shape conforming to the shape of the cathode element to be molded. A high mechanical pressure is then applied to the piston, thereby to compress the mix, and a high density electrical current is passed through the mix while the latter is under pressure. The pressure and current are maintained until the mix conforms to the shape of the piston and the walls of the mold, resulting in the formation of a strong green carbon element. The time of heating may thus be very short, even as little as one second or less. However the intensity of the electrical current and the time of heating must be controlled so that the temperature is sufficient to permit the thermoplastic binder to bind the particles of the electrically conductive material together and so that the temperature is not elevated to a point where decomposition of the binder and formation of gases could result. After the piston advances to the point representing formation of the molded article, the electric current is cut off and then the pressure is released and the mold is opened. There should be a sufficient interval of time between the interruption of the current and the release of the pressure to permit the heat to pass from the product into the walls of the mold, allowing the product to cool below the temperature of plasticity.

The oven shown in Figures 17 and 18 is admirably suited for carrying out this process and comprises an annular metallic wall 60, an inner surface 61 of which corresponds to the outer side wall of the carbon cup. A metallic mold bottom 62 is inserted in the central hole and is shaped in accordance with the closed end wall of the carbon cup, for example, in a shape conforming to the closed end 21 of the cup shown in Figure 1. The element 62 may, if desired, be integral with the wall 60. A piston element 63 is adapted to fit within the central hole of the oven wall 60 and is provided with an annular elongated end 64 which corresponds in shape to the space between the cathode elements 20 and 22 in the cup of Figure 1. Within the piston element 63 is provided a secondary piston 65 of a length such that its lower end will correspond to the desired position of the end of the central cathode element when its upper end is flush with the top of the piston element 65. The formed battery cup is shown at 66. An electric insulating annular ring 67 (which is preferably made from ceramic material) separates the piston 63 from the wall 60 so that, when electrical power is applied to the piston 63 and the wall 60 from a transformer 68, current cannot flow directly from the piston 63 to the wall 60 but must pass solely through the mix.

In operation, the proper quantity of carbon mix is placed in the mold space defined by the wall 60 and the bottom 62. If desired the metal contact member 70 may be placed in the mold space before the carbon mix, whereby it will be bonded to the mix in the molding operation. The metal contact may be a preformed member or it may be a flat bottomed piece which will be caused to conform to the desired shape of the mold by virtue of the pressure exerted on it through the mix. If desired, a ring of plastic or metal such as illustrated by reference numeral 71, but in any desired form, may also be joined to the carbon in the molding operation. Ring 71 might be made, for example, from cellulose acetate. Such a preformed ring is placed next to the shoulder and around the piston 65 so that it will join and be bonded to the mix when the mix is forced up against the shoulder of the piston. Such a ring can be used to protect the top edge of the carbon or to aid in providing a seal to the cell. A preferred form of such a ring is the grooved plastic ring 71 which surrounds the entire top edge of the carbon protecting it from chipping or breaking during handling or cell assembly.

After the mold has been assembled with the mix and the pistons in place, it is placed in a press with the mold resting on and in electrical connection with the lower platen which is in turn connected to one terminal of the transformer 68. This effects an electrical connection with both the mold bottom 62 and the wall 60. The upper platen of the press, which is electrically insulated from the remainder of the press and is connected to the other terminal of the transformer, is next brought into contact with the piston element 63. Pressure is then applied through the press, causing the piston 65 to contact the mass of mix. The mix will start to conform to the shape defined by the piston and mold walls but will not completely do so until it is heated. Pressure is then maintained and electric current is applied from the transformer 68. When the current is applied, it passes through the mix, which is located between the piston and the mold walls, as shown by the arrows in Figure 17. The mix thereupon softens from the heat generated by the passage of current and conforms exactly to the shape of the molding cavity. When the mix starts to soften, the piston 63 will travel further into the mold to the final position illustrated and the mix will be forced up into the central space and against the secondary piston 65, which will in turn be forced upward until it contacts the upper plate of the press. The time of application of pressure and current will vary with the magnitudes thereof and with the raw materials selected. With a piston diameter of 1 1/16 inches and a total hydraulic pressure applied to the piston of 20,000 lbs. and a current of 1200 amperes, a time of one minute was found satisfactory in preparing a battery cup with 1.25 inches outside diameter and of the type illustrated in Figure 1, from a mixture consisting of 5% carbon black, 23% coal tar pitch (M.P. 105° C.) and 72% electric furnace graphite (scrap electrode material). After the piston assumes its final position, the electric current is disconnected and the heat from the molded article will quickly flow into the metal parts of the mold, which may be cooled by flow of liquid through suitable passages when used repetitively, and the article will solidify. The pressure is then released and the mold removed from the press. The mold body 60 is then held rigidly and pressure is exerted through the opening in the bottom plate 72, against the mold bottom 62, to force the formed cup 66, together with the piston element 63, upward and out of the mold. The piston element 63 is then held rigidly and pressure is exerted against the secondary piston 65 to apply pressure against the central cathode of the cup 66 and force the entire cup off of the piston 63. It will be understood that other details of procedure may also be used and that the method is admirably suited to a highly mechanized and automatic operation. It will also be obvious to anyone skilled in the art that this molding operation is admirably suited to be combined with a mechanized cell assembly operation.

Other mixes which have been found satisfactory include 15.6% coal tar pitch along with 39% electric furnace graphite, 5.4% carbon black, and 40% natural flake graphite; 75% calcined petroleum coke and 25% coal tar pitch; and 20% phenol formaldehyde molding powder and 80% electric furnace graphite. A satisfactory cup was also made from a mixture consisting of 40% manganese dioxide ($MnO_2$), 3% carbon black, 13.8% coal tar pitch and 43.2% electric furnace graphite. The mix may be adjusted as desired to vary the electrical and physical properties of the resulting cup. However, the proportion of binder material used is limited by the conductivity requirements of the final cup. For primary battery purposes, the cup resistivity will normally be from $20-750\times10^{-4}$ ohm-inches. The percentage compositions mentioned above are by weight.

It has been pointed out previously that the central cathode element of the battery of the invention need not be integral with the carbon cup. If desired, the central cathode element can be preformed and placed in the mold in which the cup element is to be formed so that it will be bonded securely to the base of the cup. Thus, for example, in the oven of Fig. 17, the central cathode element could be inserted in preformed shape so that when pressure and current are applied the central cathode element will be firmly bonded to the base of the cup. Alternatively, the central cathode element may be formed from a mix different than the mix used for the cup element so that the central cathode element will have a different electrical resistance. For this purpose, after the piston has been inserted but before current is applied or substantial pressure is applied, the mix for the central cathode element could be inserted through a suitable aperture in the piston. This aperture could then be plugged and the process proceed as before. An important advantage secured by having the central cathode element molded to the cup base is a reduction in contact resistance between the two elements of the cathode structure. Molding of the cup base with a metal cap (24 of Fig. 3) likewise reduces contact resistance.

The product made with the method and oven of the invention, employing materials such as are usual in the formation of green carbon articles by extrusion or molding, is admirably suited for battery cups. By properly choosing and proportioning the binder and the electrically conductive components, a highly conductive cup can be produced which is impervious to electrolyte and sufficiently impermeable to water vapor to prevent the battery from drying out on the shelf or in service, and is also strong enough to form a self-supporting container that can be used without any reinforcing outer jacket if desired.

Green carbon cups have not been used heretofore as cathodic containers for dry cell batteries and it is believed that such cups made with the method and oven of the invention are unique in their combinations of electrical and physical properties. Nevertheless, it will be understood that green carbon cups having the desired properties and made by any other method would fall within the scope of the invention.

The molding method and oven of the invention are particularly useful in making cathode cups for the battery of the invention. However, they are also useful in making other articles.

The principles of the invention are also applicable to a square or rectangular battery construction in which concentric but square or rectangular cross-section elements are used for the anode and the cathodes.

In order to equalize utilization of the electrolyte on both sides of the anode in the battery of the invention, the anode may be provided with one or more openings or perforations. The slot 32 (Fig. 7) serves this purpose. Since the metal anode does not form a part of the battery case, the battery of the invention is leakproof even with a perforated or slotted anode.

The low resistivity of the carbonaceous material, the large conducting area of the carbon electrode, and the low anode-cathode spacing of the battery of the invention, yield a low internal resistance. This makes possible the use of a battery mix with a relatively high resistance, such as a mix with relatively more manganese dioxide and less acetylene black than is customary. In other words, the cell of the invention can contain more active material than usual.

Figs. 21 and 22 illustrate a further form of cathode structure in accordance with the invention. In this modified form of the invention the carbon cathode structure comprises a cylindrical outer wall 80, a closed end 81, and a central cathode rod-like element 82. Surrounding the outer wall 80 there is provided a metallic shell 83, which may be made of any suitable conductive metal such as zinc, and is preferably formed integral with an end cap 84 which is adapted to encompass the closed end 81 of the carbon cathode structure and which may be shaped as shown in Fig. 3. The shell 83 preferably extends below the end of the cylindrical cathode element 80, as illustrated, and in an assembled battery will be insulated from the battery negative terminal, which will be connected to the cylindrical anode structure interposed between the outer and inner cathode elements 80 and 82. The central cathode element 82 may be provided with a central longitudinally extending conductive metal rod 85, which may be integral with or suitably welded or otherwise conductively affixed to the end cap 84.

The metallic shell 83 and the metallic rod 85 perform two principal functions. First, they act to decrease the resistance of the battery cathode elements, since a relatively short part of the conductive path will be through the carbon, most of the conductive path being through the metallic elements. This structure has been found in practice materially to increase the useful service life of the battery, particularly for high drain purposes such as photoflash applications, and to provide other operational advantages. The metal shell and rod also act to increase the structural strength and impact resistance of the battery.

It is desirable that the contact resistance between the cathode 80 and the metallic shell 83 and between the cathode element 82 and the metallic rod 85 be as low as possible in order to encourage the flow of current through the metallic path rather than longitudinally along the carbon cathode elements. For this purpose, the carbon cathode elements are preferably bonded to the metal elements, which bonding can be accomplished, simultaneously with the formation of the cathode elements, in accordance with the process of the invention.

The shell 83 and the end cap 84 resemble in structure the zinc cathode element of the conventional dry cell battery, and may, if desired, be manufactured in the same ways that are customarily employed for such zinc cathode elements. The central metallic rod 85 may be formed at the same time as the shell 83, or may be separately formed and suitably affixed to the end cap 84. It should be understood that the shell 83 may be used without the rod 85, and that, similarly, the rod 85 affixed to an end cap constructed as shown in Fig. 3, or some similar structure, may be used without the shell 83.

The process and oven of the invention may be used to effect the bonding previously referred to. For this purpose, a preformed shell, end cap and central rod (if used) may be inserted in the mold space within the wall 60 of the oven of Fig. 17. A suitable charge may then be placed within the shell 83 and the cathode structure formed in the same way as previously described by application of pressure and electrical current. Passage of the electrical current through the mix and through the metal shell, and end cap will cause simultaneous formation of the cathode structure and bonding of the metal elements to the corresponding carbon cathode elements (as previously described in connection with the end cap alone), thereby producing a unitary structure with little or no internal contact resistance and with very large mechanical strength. It will be evident that this form of the invention is equally applicable to a construction in which the central cathode element is not integral with the outer cathode element, for example, a structure of the type shown in Fig. 5.

In order to simplify manufacturing techniques, it may be desirable under some circumstances to form the metal shell and end cap structure in a mold and then, without removing this structure from the mold, to place therein a charge of suitable carbonaceous material and then form the green carbon cathode structure within the shell as described.

While the invention has been described in connection with specific embodiment thereof and in connection with specific uses, various modifications thereof will occur to those skilled in the art without departing from the spirit and scope of the appended claims.

What is claimed is:

1. A self supporting dry cell battery, comprising a carbon cup forming a first cathode, a carbon rod projecting from the base of said cup and disposed generally along the longitudinal axis of said cup and being electrically connected to said cup, said rod forming a second cathode, an annular anode disposed between said rod and said cup and being substantially concentric therewith, battery mix disposed between said anode and said cathodes, and a bibulous material carried on said anode and preventing direct contact of said anode and said mix.

2. A self supporting dry cell battery, comprising a carbon cup forming a first cathode, a carbon rod projecting from the base of said cup and disposed generally along the longitudinal axis of said cup and being integral therewith, said rod forming a second cathode, an annular metallic anode disposed between said rod and said cup and being substantially concentric therewith, battery mix disposed between said anode and said cathodes and substantially filling the space therebetween except for a relatively small space into which liquid may flow during battery discharge, and a bibulous material carried on said anode and preventing direct contact of said anode and said mix.

3. In a dry cell battery, the combination comprising a self-supporting carbon cup forming a first cathode, a carbon rod projecting from the base of said cup and disposed generally along the longitudinal axis of said cup and being electrically connected thereto, said rod forming a second cathode, and an annular metallic anode disposed between said rod and said cup and being substantially concentric therewith, the diameter of said anode being selected so that said anode is located substantially equidistant from said cathodes.

4. In a dry cell battery, the combination comprising a self-supporting carbon cup forming a first cathode, a carbon rod and said cup and being substantially concentric generally along the longitudinal axis of said cup and being electrically connected thereto, said rod forming a second cathode, an annular metallic anode disposed between said rod and said cap and being substantially concentric therewith, battery mix disposed between said anode and said cathodes and substantially filling the space therebetween, the diameter of said anode being selected so that substantially equal volumes of battery mix are disposed between said anode and each of said cathodes, and a bibulous material carried on said anode and preventing direct contact of said anode and said battery mix.

5. A dry cell battery, comprising a self-supporting carbon cup forming a first cathode, a carbon rod projecting from the base of said cup and disposed generally along the longitudinal axis of said cup and being electrically connected thereto, said rod forming a second cathode, an annular metallic anode disposed between said rod and said cup and being substantially concentric therewith, the diameter of said anode being selected so that said anode is located substantially equidistant from said cathodes, battery mix disposed between said anode and said cathodes and substantially filling the space therebetween except for a relatively small space into which liquid may flow during battery discharge, and a bibulous material carried on said anode and preventing direct contact of said anode and said mix.

6. A dry cell battery, comprising a self-supporting carbon cup forming a first cathode, a carbon rod projecting from the base of said cup and disposed generally along the longitudinal axis of said cup and being electrically connected thereto, said rod forming a second cathode, an annular metallic anode disposed between said rod and said cup and being substantially concentric therewith, battery mix disposed between said anode and said cathodes and substantially filling the space therebetween except for a relatively small space into which liquid may flow during battery discharge, the diameter of said anode being selected so that substantially equal volumes of battery mix are disposed between said anode and each of said cathodes, and a bibulous material carried on said anode and preventing direct contact of said anode and said mix.

7. A dry cell battery, comprising a self-supporting carbon cup forming a first cathode and having an open end, a carbon rod projecting from the base of said cup and disposed generally along the longitudinal axis of said cup and being electrically and mechanically connected to the closed end of said cup, said rod forming a second cathode, an annular metallic anode disposed between said rod and said cup and being substantially concentric therewith, said anode having a closed bottom forming the negative terminal of said battery and serving as a partial closure member for the open end of said cup, battery mix disposed between said anode and said cathodes and substantially filling the space therebetween except for a relatively small space into which liquid may flow during battery discharge, and a bibulous material carried on said anode and preventing direct contact of said anode and said mix.

8. A dry cell battery, comprising a self-supporting carbon cup forming a first cathode and having an open end, a carbon rod projecting from the base of said cup and disposed generally along the longitudinal axis of said cup and being electrically and mechanically connected to the closed end of said cup, said rod forming a second cathode and being made from a material having a higher conductivity than said cup, said rod and said cup having substantially equal resistances in the axial direction, an annular metallic anode disposed between said rod and said cup and being substantially concentric therewith, battery mix disposed between said anode and said cathodes and substantially filling the space therebetween except for a relatively small space into which liquid may flow during battery discharge, and a bibulous material carried on said anode and preventing direct contact of said anode and said mix.

9. A dry cell battery, as set forth in claim 8, in which the carbon rod is formed from graphite.

10. A dry cell battery, comprising a self-supporting carbon cup forming a first cathode and having an open end, a carbon rod projecting from the base of said cup and disposed generally along the longitudinal axis of said cup and being electrically and mechanically connected to the closed end of said cup, said rod forming a second cathode, an annular metallic anode disposed between said rod and said cup and being substantially concentric therewith, said anode having a closed end serving partially to close said open end of said cup and forming the battery negative terminal, battery mix disposed between said anode and said cathodes and substantially filling the space therebetween except for a relatively small space into which liquid may flow during battery discharge, a bibulous material carried on said anode and preventing direct contact of said anode and said mix, and an electrically insulating, moisture resistant member disposed between said anode and said cup and forming, with said closed end of said anode, a complete closure of the open end of said cup.

11. A dry cell battery, comprising a self-supporting carbon cup forming a first cathode and having an open end, a carbon rod disposed generally along the longitudinal axis of said cup and being electrically and mechanically connected to the closed end of said cup and projecting from said closed end of said cup, said rod forming a second cathode, an annular metallic anode disposed between said rod and said cup and being substantially concentric therewith, said anode having a closed end serving partially to close said open end of said cup and forming the battery negative terminal, battery mix disposed between said anode and said cathodes and substantially filling the space therebetween except for a relatively small space into which liquid may flow during battery discharge, a bibulous material carried on said anode and preventing direct contact of said anode and said mix, an electrically insulating, moisture resistant washer disposed between said anode and said cup adjacent the open end of said cup and forming, with the closed end of said anode, a complete closure of the open end of said cup, and a tube carried on the outside of said cup along the entire axial length thereof, said tube having an inturned lip arranged to hold the outer edge of said washer firmly in engagement with the wall of said cup at the open end thereof.

12. A dry cell battery as set forth in claim 11, in which said tube is made of a thermoplastic material.

13. A dry cell battery, comprising a self-supporting carbon cup forming a first cathode, a carbon rod disposed generally along the longitudinal axis of said cup and being integral with the base of said cup, said rod forming a second cathode, an annular metallic anode disposed between said rod and said cup and being substantially concentric therewith, said anode having at least one opening therein to permit circulation of fluid between opposite sides of said anode, battery mix disposed between said anode and said cathodes and substantially filling the space therebetween except for a relatively small space into which liquid may flow during battery discharge, and a bibulous material carried on said anode and preventing direct contact of said anode and said mix.

14. A dry cell battery, comprising a self-supporting carbon cup forming a first cathode, a carbon rod disposed generally along the longitudinal axis of said cup and being integral with the base of said cup, said rod forming a second cathode, an annular metallic anode disposed between said rod and said cup and being substantially concentric therewith, said anode having perforations therein to promote equal electrolyte utilization on each side of said anode, battery mix disposed between said anode and said cathodes and substantially filling the space therebetween except for a relatively small space into which liquid may flow during battery discharge, and a bibulous material carried on said anode and preventing direct contact of said anode and said mix.

15. A dry cell battery, as set forth in claim 13, in which said opening is an elongated slot extending axially throughout the depth of battery mix.

16. In a primary battery, a self-supporting conductive carbon cup forming a first cathode, a conductive metal shell surrounding said cup and being bonded thereto for intimate electrical contact therewith substantially throughout the axial length of said cup, a conductive carbon rod disposed generally along the longitudinal axis of said cup and being electrically connected to said cup and projecting from the base thereof, said rod forming a second cathode and having an axially extending hole, a conductive metal rod substantially filling said hole and being electrically connected to said shell, and a consumable metallic anode disposed between said carbon rod and said cup and being substantially concentric therewith.

17. A dry cell battery comprising a plurality of electrically connected self-supporting carbon cathode elements arranged concentrically, one of said cathode elements being cup-shaped and a second one of said cathode elements being formed as a rod integral with and projecting from the base of said cup and being disposed generally along the longitudinal axis of said cup, an annular anode disposed between said cathode elements and being substantially concentric therewith, battery mix substantially filling the space within said cup except for a relatively small space into which liquid may flow during battery discharge, and a bibulous material carried on said anode and preventing direct contact between said anode and said mix.

References Cited in the file of this patent

UNITED STATES PATENTS

| | | |
|---|---|---|
| 568,007 | Thomson | Sept. 22, 1896 |
| 1,017,483 | Van Brunt | Feb. 13, 1912 |
| 2,095,421 | Ruhoff et al. | Oct. 12, 1937 |
| 2,118,712 | Oppenheim | May 24, 1938 |
| 2,307,371 | Hileman | Jan. 5, 1943 |
| 2,514,718 | Oaks | July 11, 1950 |
| 2,534,403 | Blake et al. | Dec. 19, 1950 |
| 2,579,898 | Brucker | Dec. 25, 1951 |
| 2,605,299 | Teas | July 29, 1952 |
| 2,641,623 | Winckler et al. | June 9, 1953 |

FOREIGN PATENTS

| | | |
|---|---|---|
| 381,160 | France | Oct. 30, 1907 |
| 339,095 | France | Oct. 12, 1903 |
| 96,765 | Germany | Apr. 19, 1898 |

OTHER REFERENCES

Vinal, G. W.: "Primary Batteries," John Wiley & Sons, New York, 1950, page 45. (Library Call No. QC. 603, v. 5.)

UNITED STATES PATENT OFFICE

CERTIFICATE OF CORRECTION

Patent No. 2,903,499                                                     September 8, 1959

Rodolfo Rodriguez Balaguer

It is hereby certified that error appears in the printed specification of the above numbered patent requiring correction and that the said Letters Patent should read as corrected below.

Column 2, line 63, for "cathodes," read -- cathodes. --; column 10, line 68, claim 1, strike out "self supporting" and insert the same after "comprising a" in same line 68; column 11, line 3, claim 2, strike out "self supporting" and insert the same after "comprising a" in same line 3; column 11, line 28, strike out "said rod and said cup and being substantially concentric" and insert instead -- bon rod projecting from the base of said cup and disposed --; line 32, for "cap" read -- cup --.

Signed and sealed this 8th day of March 1960.

(SEAL)

Attest:

KARL H. AXLINE
Attesting Officer

ROBERT C. WATSON
Commissioner of Patents